United States Patent
Momosaki et al.

(10) Patent No.: US 7,469,148 B2
(45) Date of Patent: Dec. 23, 2008

(54) RADIO COMMUNICATION TERMINAL DEVICE AND RADIO COMMUNICATION METHOD FOR FORMING RADIO COMMUNICATION TERMINAL NETWORK

(75) Inventors: Kohei Momosaki, Kanagawa (JP); Toshiki Kizu, Kanagawa (JP); Yuzo Tamada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 270 days.

(21) Appl. No.: 11/281,468

(22) Filed: Nov. 18, 2005

(65) Prior Publication Data
US 2006/0084452 A1  Apr. 20, 2006

Related U.S. Application Data

(62) Division of application No. 10/327,107, filed on Dec. 24, 2002, now Pat. No. 6,993,354.

(30) Foreign Application Priority Data
Dec. 25, 2001  (JP) ............... 2001-392877

(51) Int. Cl.
H04B 7/00 (2006.01)
H04M 3/42 (2006.01)
H04Q 7/20 (2006.01)
(52) U.S. Cl. ............... 455/517; 426/41.1; 426/416
(58) Field of Classification Search ............ 455/426.1, 455/426.2, 564, 41.1, 41.2, 41.3, 66.1, 465
See application file for complete search history.

(56) References Cited

U.S. PATENT DOCUMENTS

| | | | |
|---|---|---|---|
| 5,029,218 A | * | 7/1991 | Nagayasu ............... 381/71.12 |
| 6,275,500 B1 | * | 8/2001 | Callaway et al. .......... 370/449 |
| 6,314,287 B1 | * | 11/2001 | Leickel et al. ........... 455/426.1 |
| 6,339,706 B1 | * | 1/2002 | Tillgren et al. ............ 455/419 |
| 6,405,027 B1 | * | 6/2002 | Bell ...................... 455/403 |
| 6,574,455 B2 | | 6/2003 | Jakobsson et al. |
| 6,650,871 B1 | | 11/2003 | Cannon et al. |
| 6,856,789 B2 | * | 2/2005 | Pattabiraman et al. ..... 455/41.2 |

FOREIGN PATENT DOCUMENTS

| | | |
|---|---|---|
| JP | 5-75612 | 3/1993 |
| JP | 10-23028 | 1/1998 |
| JP | 11-243354 | 9/1999 |
| JP | 2000-315974 | 11/2000 |

OTHER PUBLICATIONS

Bluetooth Specification Version 1.1, Baseband Specification, 10.0 Scatternet, pp. 120-123, Feb. 22, 2001.

* cited by examiner

Primary Examiner—Tilahun B Gesesse
(74) Attorney, Agent, or Firm—Oblon, Spivak, McClelland, Maier & Neustadt, P.C.

(57) ABSTRACT

A radio communication terminal network with a tree structure is formed in such a way that a plurality of receiving side terminal devices on a downstream side of a source terminal device are connected to the source terminal device, and other receiving side terminal devices on a further downstream side are connected to at least one of the plurality of the receiving side terminal devices.

16 Claims, 6 Drawing Sheets

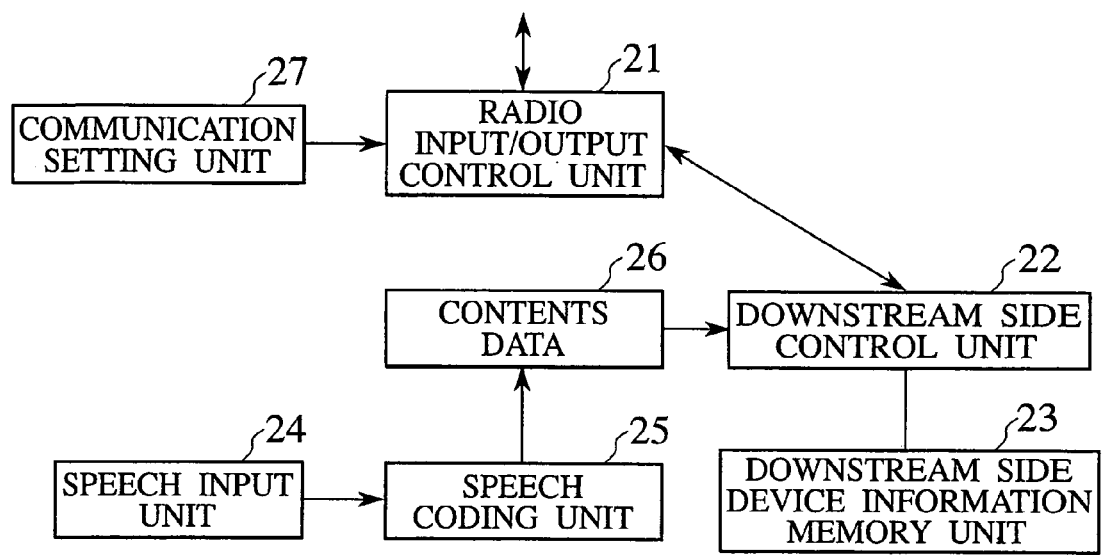
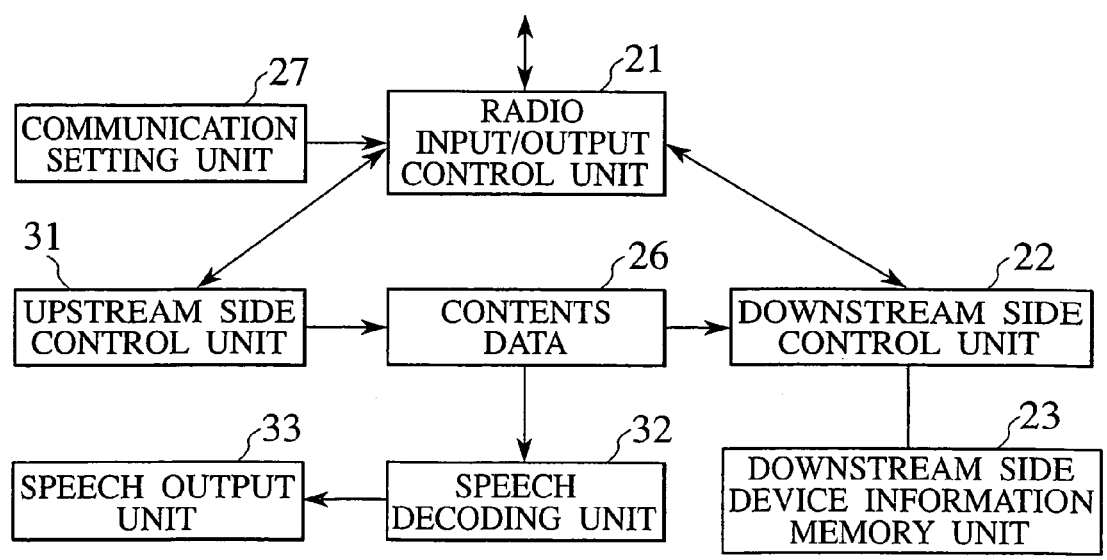

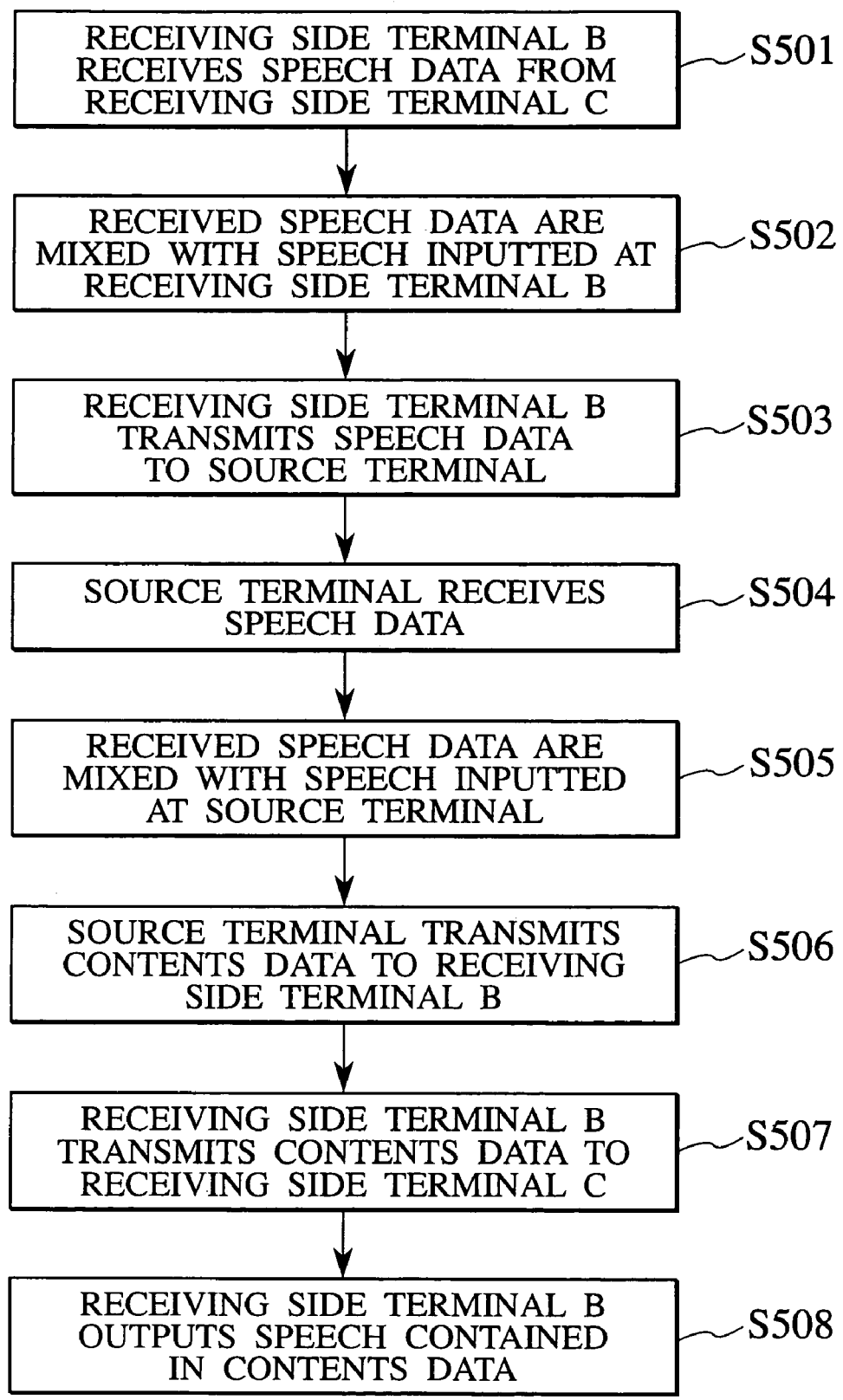

RADIO COMMUNICATION TERMINAL DEVICE AND RADIO COMMUNICATION METHOD FOR FORMING RADIO COMMUNICATION TERMINAL NETWORK

CROSS-REFERENCE TO RELATED APPLICATIONS

This application is a Divisional of U.S. patent application Ser. No. 10/327,107, filed Dec. 24, 2002, and claims priority to Japanese Patent Application No. 20001-392877, filed Dec. 25, 2001. The contents of U.S. patent application Ser. No. 10/327,107 are incorporated herein by reference in their entirety.

BACKGROUND OF THE INVENTION

1. Field of the Invention

The present invention relates to a communication terminal device using radio and a method for constructing a communication terminal network to be formed as an aggregate of the communication terminal devices, and mainly aims at providing the speech transmission.

2. Description of the Related Art

In the case of carrying out the speech transmission by radio with respect to unspecified many, it is customary to use a high output transmission device that can transmit to a wide ranging area. This is effective when receivers exist in a wide ranging area.

On the other hand, it is also possible to use a transmission device using low power radio. This is generally of a small size and inexpensive, and associated with little restriction regarding the radio wave resources, so that it can be used with ease.

However, the use of the high output transmission device can be problematic regarding the utilization efficiency of the radio band and the energy when the receivers actually do no exist in a wide ranging area.

Also, the transmission device using low power radio is difficult to use with respect to unspecified many because the transmission range is limited to the close distances. It is also impossible to enlarge its range easily when the receivers increased.

Moreover, the speech transmission is unidirectional, and it is difficult to realize the bidirectional transmissions in which arbitrary receiver at arbitrary timing can utter the speech to participate.

BRIEF SUMMARY OF THE INVENTION

It is therefore an object of the present invention to provide a radio communication terminal device and a radio terminal network forming method capable of realizing bidirectional transmissions and enlarging the transmission range arbitrarily by using low power radio.

According to one aspect of the present invention there is provided a radio communication terminal device for use as a source terminal device in a radio communication terminal network with a tree structure in which a plurality of receiving side terminal devices on a downstream side of the source terminal device are connected to the source terminal device, and other receiving side terminal devices on a further downstream side are connected to at least one of the plurality of the receiving side terminal devices, the radio communication terminal device comprising: a speech input unit configured to input speeches; a speech coding unit configured to encode the speeches inputted by the speech input unit to generate contents data; a downstream side control unit configured to respond to a search from one downstream side device that requests the contents data among a plurality of downstream side devices or search the one downstream side device, and make a connection for communication with the one downstream side device; and a radio input/output control unit configured to transmit the contents data to the one downstream side device.

According to another aspect of the present invention there is provided a radio communication terminal device for use as a receiving side terminal device in a radio communication terminal network with a tree structure in which a plurality of receiving side terminal devices on a downstream side of a source terminal device are connected to the source terminal device, and other receiving side terminal devices on a further downstream side are connected to at least one of the plurality of the receiving side terminal devices, the radio communication terminal device comprising: an upstream side control unit configured to search one upstream side device that provides contents data containing speech information among a plurality of upstream side devices or respond to a search from the one upstream side device, and make a connection for communication with the one upstream side device; a downstream side control unit configured to respond to a search from one downstream side device that requests the contents data among a plurality of downstream side devices or search the one downstream side devices, and make a connection for communication with the one downstream side device; a radio input/output control unit configured to receive the contents data from the one upstream side device and transmit the contents data to the one downstream side device; a speech decoding unit configured to decode the speech information contained in the contents data; and a speech output unit configured to present the speech information decoded by the speech decoding unit in an acoustically audible form.

According to another aspect of the present invention there is provided a radio communication method in a radio communication terminal network with a tree structure in which a plurality of receiving side terminal devices on a downstream side of a source terminal device are connected to the source terminal device, and other receiving side terminal devices on a further downstream side are connected to at least one of the plurality of the receiving side terminal devices, the radio communication method comprising: transmitting contents data from the source terminal device to the plurality of the receiving side terminal devices on the downstream side, the contents data containing speeches inputted at the source terminal device; relaying and transmitting the contents data at one receiving side terminal device among the plurality of the receiving side terminal devices, to one other receiving side terminal devices among the other receiving side terminal devices on the further downstream side; extracting the speeches contained in the contents data and outputting the speeches in an audible form at the one receiving side terminal device; and extracting the speeches contained in the contents data and outputting the speeches in an audible form at the one other receiving side terminal device.

Other features and advantages of the present invention will become apparent from the following description taken in conjunction with the accompanying drawings.

BRIEF DESCRIPTION OF THE DRAWINGS

FIG. 2 is a block diagram showing a configuration of a source terminal device according to the first embodiment of the present invention.

FIG. 3 is a block diagram showing a configuration of a receiving side terminal device according to the first embodiment of the present invention.

FIG. 10 is a flow chart showing a procedure of a radio communication method according to the second embodiment of the present invention.

DETAILED DESCRIPTION OF THE INVENTION

Referring now to FIG. 1 to FIG. 7, the first embodiment of the present invention will be described in detail.

Figure 1:
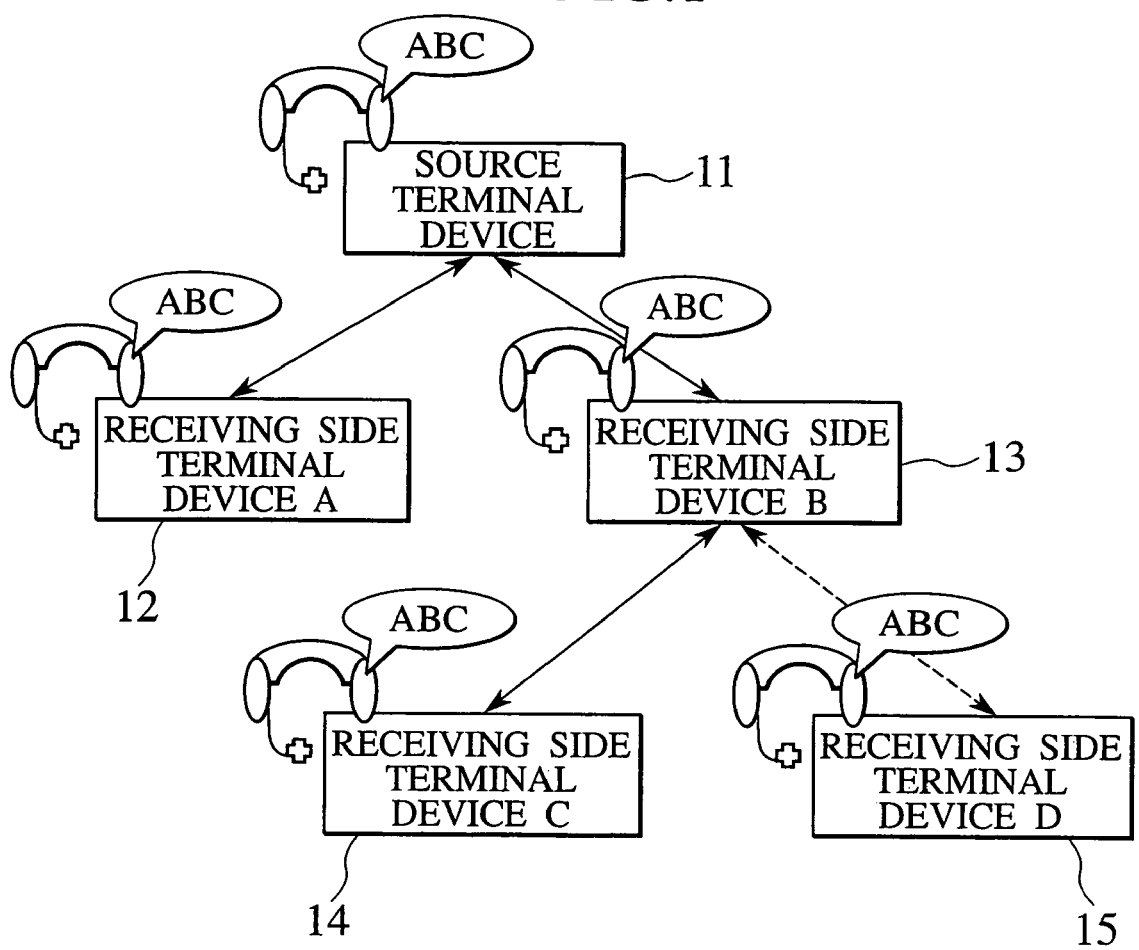
FIG. 1 is a schematic diagram showing a configuration of a radio communication terminal network according to the first embodiment of the present invention.

FIG. 1 shows a radio communication terminal network according to the first embodiment, which comprises a plurality of radio terminal devices for carrying out speech communications. One terminal network comprises a source terminal device 11, and a plurality of receiving side terminal devices, which includes a receiving side terminal device A 12, a receiving side terminal device B 13, a receiving side terminal device C 14 and a receiving side terminal device D 15 in this example. As an example, in FIG. 1, the receiving side terminal device A 12 and the receiving side terminal device B 13 are connected to the source terminal device 11, the receiving side terminal device C 14 is connected to the receiving side terminal device B 13, and the receiving side terminal device D 15 is about to be connected the receiving side terminal device B 13. There are four receiving side terminal devices, but the number is variable and the connection target is determined according to the situation under some conditions.

In the following description, the terminal device that transmits contents data to each terminal device, such as the source terminal device 11 from viewpoints of the receiving side terminal device A 12 and the receiving side terminal device B 13 or the receiving side terminal device B 13 from viewpoints of the receiving side terminal device C 14 and the receiving side terminal device D 15, will be referred to as an "upstream side device". Also, the terminal device to which each terminal device transmits contents data, such as the receiving side terminal device A 12 and the receiving side terminal device B 13 from a viewpoint of the source terminal device 11 or the receiving side terminal device C 14 and the receiving side terminal device D 15 from a viewpoint of the receiving side terminal device B 13, will be referred to as a "downstream side device".

Each terminal uses a low power radio as a medium, so that when the radio communication between the terminals becomes possible as a result of the moving of the terminal location or the like, a request for searching connectable terminals is issued, a request for a connection between terminals is issued, a connection target is selected., and a connection between terminals is established, to enlarge the terminal network.

The terminal network has an identifier for distinguishing it from the others, which can be used in the case where there is a need to make the distinction at a time of communication between terminals. Here, it is assumed that the terminal network has an identifier "ABC" that is set in advance.

Each terminal is in a shape of a headset which can be suitably worn on a head.

The source terminal device 11 becomes a start point of the terminal network, and has a function for inputting the speeches of the lecturer or the sounds of the player from a microphone and transmitting them in real time to a plurality of receiving side terminal devices 12, 13, 14 and 15. The receiving side terminal devices 12 to 15 are terminals having the same configuration, and have a function for receiving the contents data 26 such as speeches from at least one terminal and relaying and transmitting these data in real time to a plurality of terminals. They also have a function for extracting the speech information from the received contents data 26, and presenting them in an acoustically audible form from speakers of the headset.

In the terminal network so configured, the speech data are relayed and transmitted, from the source terminal device 11 to the receiving side terminal device A 12 and the receiving side terminal device B 13, and from the receiving side terminal device B 13 to the receiving side terminal device C 14 and the receiving side terminal device D 15.

FIG. 2 shows a configuration of the source terminal device 11.

The source terminal device 11 according to the first embodiment comprises a radio input/output control unit 21, a downstream side control unit 22, a downstream side device information memory unit 23, a speech input unit 24, a speech coding unit 25, and a communication setting unit 27, and transmits contents data 26.

The radio input/output control unit 21 carries out radio communications with the other terminals. The downstream side control unit 22 makes connections with a plurality of downstream side devices, with a preset number as an upper limit, and the downstream side device information memory unit 23 stores information of the downstream side devices. The stored information of the downstream side devices may include information on the number of connected downstream side devices, and information on users, locations, etc., of each downstream side device.

Also, the speech input unit 24 carries out the input of the speeches, and more specifically, inputs the speeches of the lecturer or the sounds of the player. The speech coding unit 25 encodes the inputted speeches, and generates the contents data 26 to be transmitted to the terminal network. This contents data 26 is given to the downstream side control unit 22, and transmitted to the plurality of connected downstream side devices through the radio input/output control unit 21. Also, to the downstream side control unit 22, a value 0 is set as a number of relaying, and outputted at a time of the connection processing according to the need.

The communication setting unit 27 sets the identifier for distinguishing the terminal network to the radio input/output control unit 21. In the terminal network shown in FIG. 1, the identifier is "ABC". This identifier is used for the control of the connection at the downstream side control unit 22. Also, the communication setting unit 27 sets an upper limit value for a number of connections to the downstream side devices to the downstream side control unit 22. The upper limit value for the number of connections can be set to a prescribed value, or according to a requested quality of the contents data 26 and a throughput required for the transmission between the terminals. In the following description, as an example, it is assumed that the upper limit value for the number of connections is set to "2".

Next, FIG. 3 shows a configuration of the receiving side terminal device, which is the same for the receiving side terminal device A 12, the receiving side terminal device B 13, the receiving side terminal device C 14 and the receiving side terminal device D 15.

The receiving side terminal device 12, 13, 14 or 15 according to the first embodiment comprises a radio input/output control unit 21, a downstream side control unit 22, a downstream side device information memory unit 23, a communication setting unit 27, an upstream side control unit 31, a speech decoding unit 32 and a speech output unit 33, and transmits or receives contents data 26.

The radio input/output control unit 21, the downstream side control unit 22, the downstream side device information memory unit 23 and the communication setting unit 27 are the same as those of the source terminal device 11 according to the first embodiment so that their description will be omitted here.

The upstream side control unit 31, selects an upstream side device and makes a connection. At this point, the value of the number of relaying is received from the upstream side device. When the connection to the upstream side device is established, the contents data 26 is received.

The speech decoding unit 32 decodes the speech information contained in the contents data 26, and the speech output unit 33 presents the speech signals in an acoustically audible form. This contents data 26 is given to the downstream side control unit 22, and transmitted to the plurality of connected downstream side devices through the radio input/output control unit 21. Also, to the downstream side control unit 22, a value obtained by adding "1" to the number of relaying of the upstream side device is set, and outputted at a time of the connection processing according to the need.

Note that the identifier set by the communication setting unit 27 is used for the control of the connection at the downstream side control unit 22 and the upstream side control unit 31.

According to the source terminal device 11 and the receiving side terminal devices 12 to 15 of the first embodiment, there is no need to provide relay devices in advance, and it is possible to send the speeches of the lecturer or the music of the player to many terminals. It is also possible to enlarge the range automatically according to the number of audiences or terminals, and it is possible to convey the information to many people without imposing any limitation on a space to accommodate people. In addition, compared with the case of outputting speeches by providing large size speakers, the problem of producing noises does not arise and the problem of the speeches sounding delayed at distance also does not arise.

The connection operation between the source terminal device 11 and the receiving side terminal device B 13 is also carried out similarly according to FIG. 4, as follows.

The upstream side control unit 31 of the receiving side terminal device B 13 which is the downstream side device transmits a request signal for searching the upstream side device (step S101). At this point, when the identifier for specifying the terminal network is set to the radio input/output control unit 21, the search request signal which specifies that identifier is transmitted.

The search request is received by the downstream side control unit 22 of the source terminal device 11 and the downstream side control unit 22 of the receiving side terminal device A 12. The source terminal device 11 returns a response signal containing information of the number of relaying "0", whereas the receiving side terminal device A 12 returns a response signal containing information of the number of relaying "1" (step S102). Note that the other receiving side terminal devices 14 and 15 do not respond even when the request signal for searching the upstream side device is received because they are not connected to the terminal network.

The receiving side terminal device B 13 transmits a connection request to the source terminal device 11 for which the number of relaying is smaller among the received response signals (step S103), and establishes the connection (step S104). Then, the contents data 26 is transmitted from the source terminal device 11 to the receiving side terminal device B 13 (step S105).

The connection operation between the receiving side terminal device B 13 and the receiving side terminal device C 14 or the receiving side terminal device D 15 is also carried out similarly.

The upstream side control unit 31 of the receiving side terminal device C 14 or the receiving side terminal device D 15 which is the downstream side device transmits a request signal for searching the upstream side device which specifies the identifier for specifying the terminal network (step S101).

The search request is received by the downstream side control unit 22 of the source terminal device 11, the downstream side control unit 22 of the receiving side terminal device A 12 and the downstream side control unit 22 of the receiving side terminal device B 13. The source terminal device 11 does not respond as the number of downstream side connections has already reached the upper limit of "2". Each one of the receiving side terminal device A 12 and the receiving side terminal device B 13 returns a response signal containing information of the number of relaying "1" (step S102). Here, it is assumed that the receiving side terminal device B 13 returned the response signal first.

The receiving side terminal device C 14 or the receiving side terminal device D 15 transmits a connection request to the receiving side terminal device B 13 for which the number of relaying is smaller among the received response signals and which responded first (step S103), and establishes the connection (step S104). Then, the contents data 26 is transmitted from the receiving side terminal device B 13 to the receiving side terminal device C 14 or the receiving side terminal device D 15 (step S105).

Figure 5:
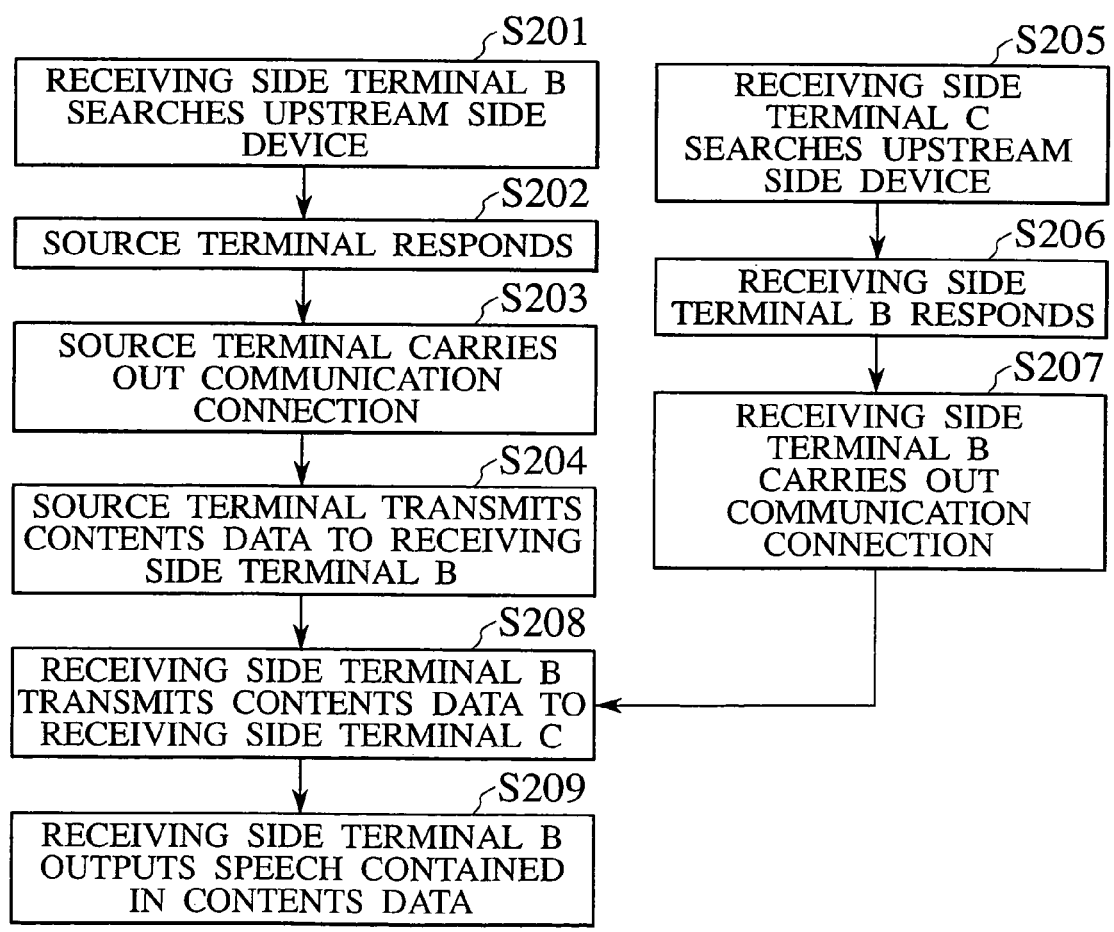
FIG. 5 is a flow chart showing a procedure of one exemplary radio communication method according to the first embodiment of the present invention.

Next, a method for carrying out the radio communication by carrying out the connection operation described above from a viewpoint of the receiving side terminal device B 13 will be described with reference to FIG. 5.

(a) First, at the step S201, the receiving side terminal device B 13 searches the upstream side device. At this point, as described in the steps S102 to S105, suppose that the source terminal device 11 responded at the step S202. Then, the connection for the communication with the receiving side terminal device B 13 is made by the source terminal device 11 at the step S203, and the contents data 26 is transmitted at the step S204.

(b) On the other hand, at the step S205, the receiving side terminal device C 14 also searches the upstream side device. At this point, as described in the steps S102 to S105, suppose that the receiving side terminal device B 13 responded at the step S206. Then, the connection for the communication is made by the receiving side terminal device B 13 at the step S207.

(c) At the step S208, the receiving side terminal device B 13 transmits the contents data 26 received from the source terminal device 11 at the step S204, to the receiving side terminal device C 14 for which the connection for the communication is made.

(d) At the step S209, the receiving side terminal device B 13 outputs the speech contained in the contents data 26.

According to the radio communication method of the first embodiment, the downstream side device searches the upstream side device so that it is possible to enlarge the transmission range arbitrarily while using the low power radio.

Next, another connection operation that can be carried out between the upstream side device and the downstream side device will be described with reference to FIG. 6.

(A) At the step S301, the upstream side device transmits a request signal for searching the downstream side device, when the number of downstream side connections has not reached the upper limit. At this point, when the identifier for specifying the terminal network is set to the radio input/output control unit 21, the search request signal which specifies that identifier is transmitted. Also, the search request signal contains information of the number of relaying from the source terminal device.

(B) Next, at the step S302, the downstream side device that received the search request transmits a response signal for the search request to the upstream side device when it is set in a search waiting state, and the identifier matches with that of the terminal network to which it is trying to belong. When the downstream side device received a plurality of search requests, the response for the search request of the terminal for which the number of relaying from the source terminal device is smaller is transmitted.

When there is no downstream side device that can meet these conditions within a radio communication possible range between the terminals, the upstream side device cannot receive the response signal for the search request. In this case, it is possible to select whether or not to interrupt the connection operation. It is also possible to make this selection in advance. In the case of continuing the connection operation, after an appropriate time interval, the search request signal is transmitted again.

(C) Next, at the step S303, the upstream side device that received the response transmits a connection request signal to the downstream side device.

(D) Next, at the step S304, the downstream side device that received the connection request transmits a connection response signal to the upstream side device.

(E) Next, at the step S305, the connection between two devices is established and the contents data 26 is transmitted from the upstream side device to the downstream side device.

Figure 7:
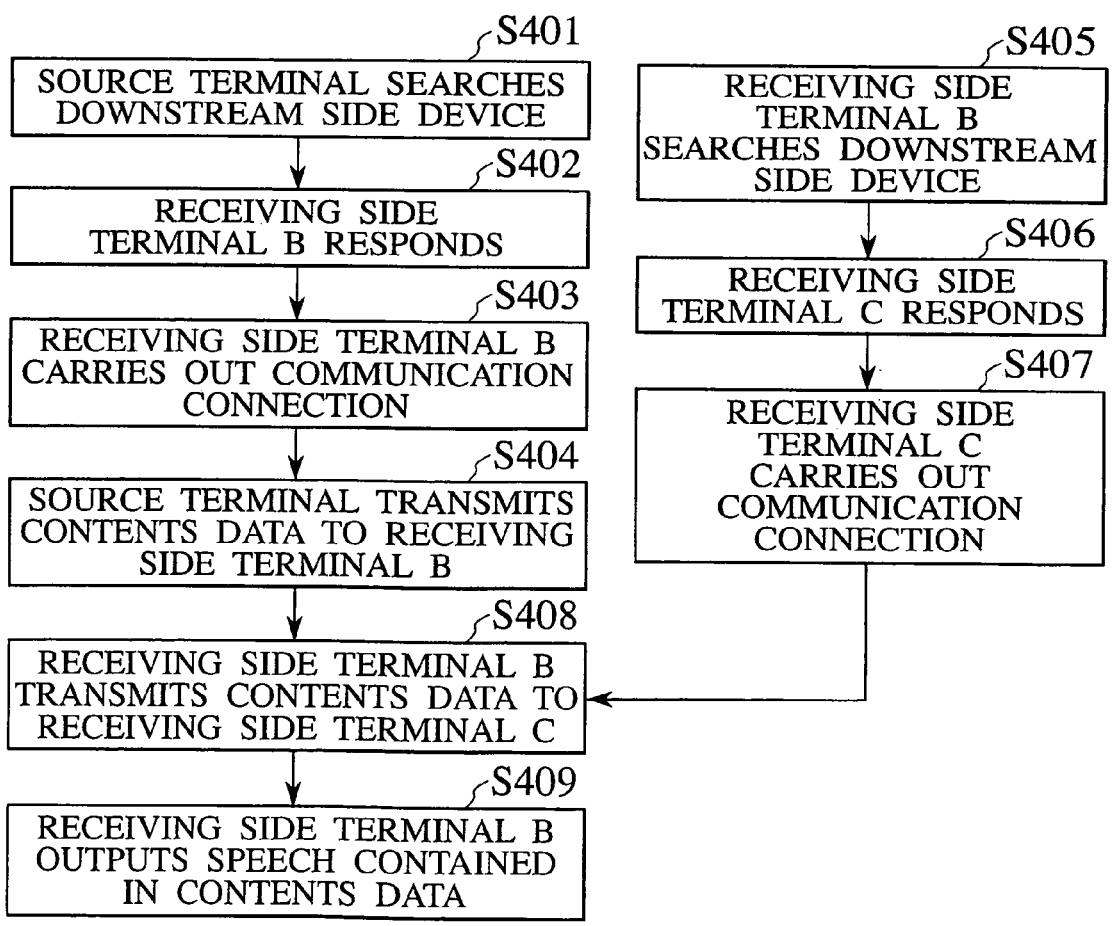
FIG. 7 is a flow chart showing a procedure of another exemplary radio communication method according to the first embodiment of the present invention.

Next, a method for carrying out the radio communication by carrying out the connection operation described above from a viewpoint of the receiving side terminal device B 13 will be described with reference to FIG. 7.

(a) First, at the step S401, the source terminal device 11 searches the downstream side device. At this point, as described in the steps S302 to S305, suppose that the receiving side terminal device B 13 responded at the step S402. Then, the connection for the communication with the source terminal device 11 is made by the receiving side terminal device B 13 at the step S403, and the source terminal device 11 transmits the contents data 26 at the step S404.

(b) On the other hand, at the step S405, the receiving side terminal device B 13 also searches the downstream side device. At this point, as described in the steps S302 to S305, suppose that the receiving side terminal device C 14 responded at the step S406. Then, the connection for the communication is made by the receiving side terminal device C 14 at the step S407.

(c) At the step S408, the receiving side terminal device B 13 transmits the contents data 26 received from the source terminal device 11 at the step S404, to the receiving side terminal device C 14 for which the connection for the communication is made.

(d) At the step S409, the receiving side terminal device B 13 outputs the speech contained in the contents data 26.

According to the radio communication method of the first embodiment, the upstream side device searches the downstream side device so that it is possible to enlarge the transmission range arbitrarily while using the low power radio.

Note that each terminal in FIG. 1 can use a device having a communication function according to the Bluetooth specification.

The Bluetooth utilizes the ISM band of 2.4 GHz band that can be handled without license, and uses the frequency hopping spectrum spreading (FHSS) scheme. By switching 79 channels in 1 MHz bandwidth 1600 times per second randomly (frequency hopping), the interferences with the other radio communications are prevented. The radio power is 100 mW maximum, the transmission range of up to about 100 m is possible, but in the usually used devices, the radio power is less than or equal to 2.5 mW and the transmission range is about 10 m.

In the case of connecting the Bluetooth compatible devices (units), there is a need to match the frequency hopping pattern. A unit (master) for determining the frequency hopping pattern and a unit (slave) for carrying out communications by obeying the master become a communication possible state through processes called inquiry and page.

In FIG. 1, the source terminal device 11 becomes master while the receiving side terminal device A 12 and the receiving side terminal device B 13 carry out communications as slaves, and the receiving side terminal device B 13 also becomes a master while the receiving side terminal device C 14 and the receiving side terminal device D 15 become slaves. As such, it is possible to construct a network in which devices are linked (scatter-net) as a slave becomes a master of the others.

In FIG. 2 to FIG. 7, the upstream side device becomes a master and the downstream side device becomes a slave, and at most seven slaves can be connected to a single master. The bandwidth is shared by these eight terminals, so that there is a possibility for becoming impossible to secure the bandwidth necessary for the data transmission if the number of slaves is increased. Here, the necessary throughput is changed according to the requested quality of the contents data 26, so that it is possible to reduce the number of slaves that can be connected according to the necessary throughput.

It is also possible to set the number of slaves that can be connected in accordance with the throughput necessary for the transmission of the contents data 26, according to the contents data 26 received from the upstream side device. For example, when there is a bandwidth of 720 kbps available for communication from the upstream side toward the downstream side, and the contents data 26 requires 180 kbps, the number of slaves that can be connected is limited to at most four.

Figure 4:
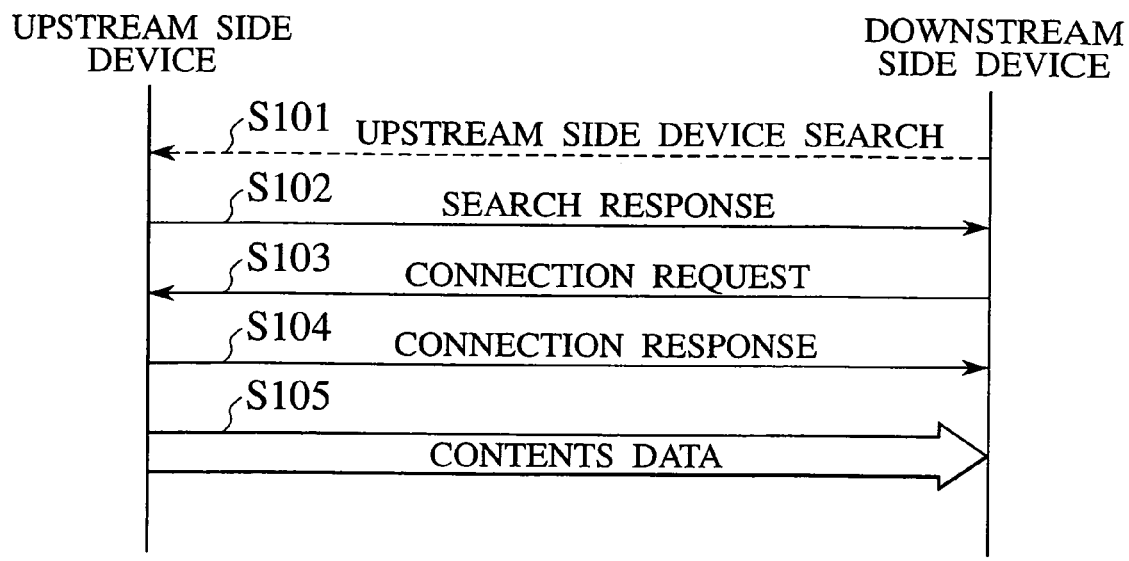
FIG. 4 is a sequence chart showing one exemplary connection operation between an upstream side device and a downstream side device according to the first embodiment, of the present invention.
Figure 6:
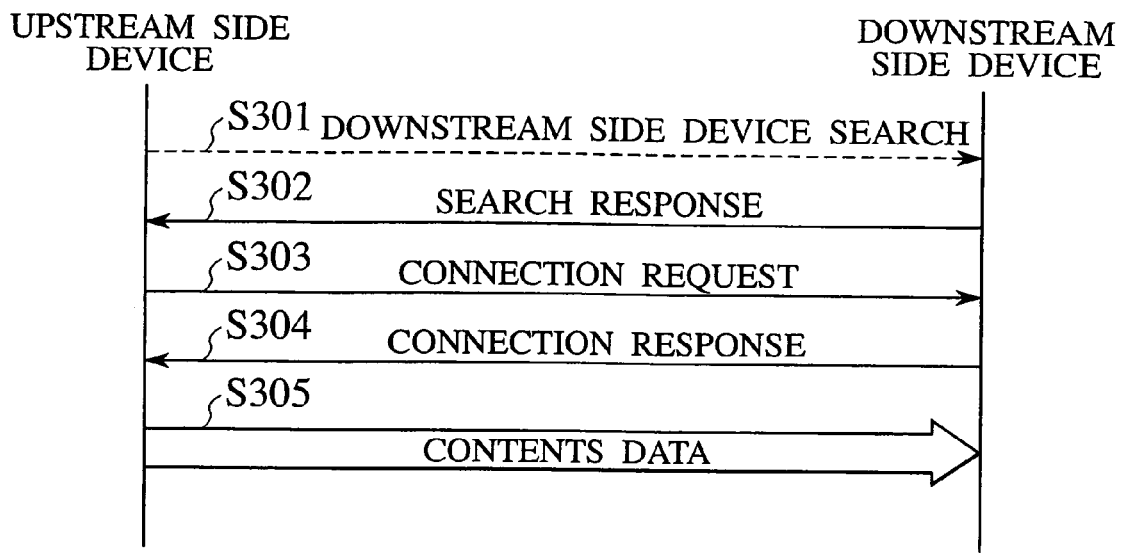
FIG. 6 is a sequence chart showing another exemplary connection operation between an upstream side device and a downstream side device according to the first embodiment of the present invention.

The steps S101, S102, S103 and S104 of FIG. 4 and the steps S301, S302, S303 and S304 of FIG. 6 respectively correspond to an inquiry message, an inquiry response message, a page message, and a page response message. The message contains information of the Bluetooth device address of the unit, and in the connection operation, the Bluetooth device address is stored in the downstream side device information memory unit 23 shown in FIG. 2 and FIG. 3.

Note that the present invention is effective as a method for configuring a device that transmits the contents data 26 such as speeches by using radio, with respect to unspecified many that are close to each other. This can be utilized for wide variety of applications, regardless of indoor or outdoor, such as a lecture hall, a concert hall, a wayside speech, a street music, a small scale broadcast for a crowd, etc.

Figure 8:
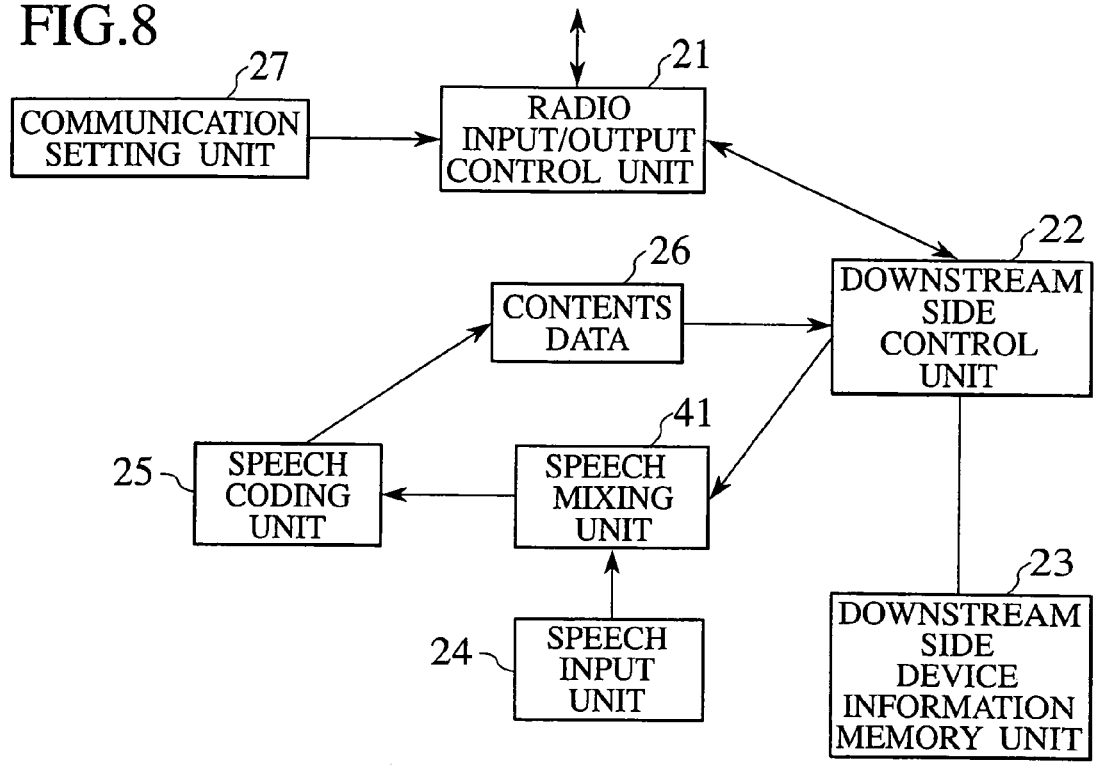
FIG. 8 is a block diagram showing a configuration of a source terminal device according to the second embodiment of the present invention.
Figure 9:
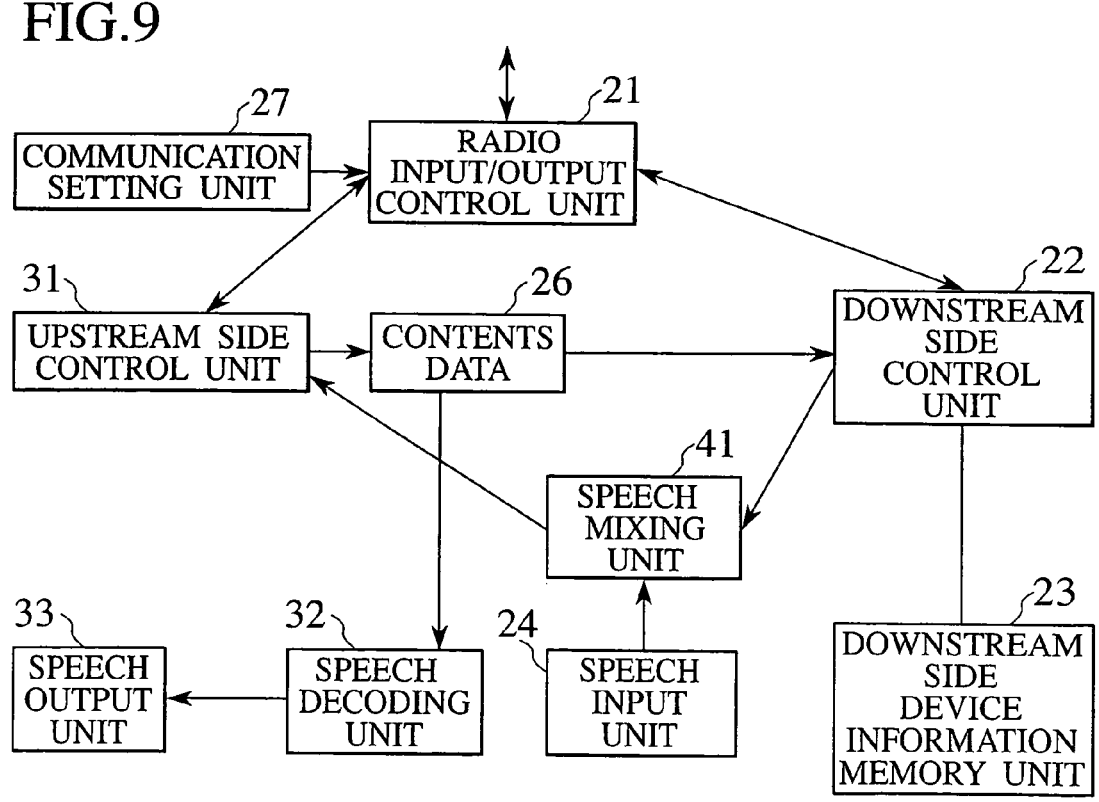
FIG. 9 is a block diagram showing a configuration of a receiving side terminal device according to the second embodiment of the present invention.

Referring now to FIG. 8 to FIG. 10, the second embodiment of the present invention will be described in detail.

In the radio communication terminal network according to the second embodiment, the speeches inputted at the receiving side terminal devices are collected and transmitted to the entire terminal network such that the bidirectional transmission of contents or speeches becomes possible.

The radio communication terminal network according to the second embodiment has a configuration as shown in FIG. 1, similarly to the radio communication terminal network according to the first embodiment. The receiving side terminal devices 12 to 15 are terminals having the same configuration, and have a function for receiving the contents data 26 such as speeches from at least one terminal and relaying and transmitting these data in real time to a plurality of downstream side devices. They also have a function for extracting the speech information from the received contents data 26, and presenting them in an acoustically audible form from speakers of the headset. In addition, in the radio communication terminal network according to the second embodiment, they also have a function for mixing the speeches inputted from a microphone of a terminal with the speeches received from a plurality of downstream side devices, and transmitting them in real time to the upstream side device.

The source terminal device 11 becomes a start point of the terminal network, and has a function for inputting the speeches of the lecturer or the sounds of the player from a microphone, mixing them with the speeches received from a plurality of downstream side devices, and transmitting them in real time to a plurality of receiving side terminal devices.

In the terminal network so configured, the speech data are mixed with the speeches inputted at each terminal such as those transmitted from the receiving side terminal device C 14 and the receiving side terminal device D 15 to the receiving side terminal device B 13, or those transmitted from the receiving side terminal device A 12 and the receiving side terminal device B 13 to the source terminal device 11, and then relayed and transmitted, from the source terminal device 11 to the receiving side terminal device A 12 and the receiving side terminal device B 13, and from the receiving side terminal device B 13 to the receiving side terminal device C 14 and the receiving side terminal device D 15.

Here, the mixing of the speeches is done by controlling a ratio of the speeches from each downstream side device and the speech input of this terminal itself, according to a value of the number of relaying from the source terminal device 11. It is also possible to carry out the processing for suppressing the lower audio range of the speeches from each downstream side device, when the number of relaying from the source terminal device is large. In this way, it is possible to mix the speeches according to a value that approximates an actual distance between the source terminal device and the downstream side device. In addition, it is also possible to mix the speeches such that the volume of the speeches from the terminal at a far location is reduced, by referring to a location information or an information stored in advance (a profile information of a user) in the downstream side device, and it is also possible to mix the speeches such that the volumes of the speeches to be mixed are changed differently for males and females or only the speeches of the females are mixed, by referring to the information on gender of each user.

At this point, the speech transmission from the downstream side device to the upstream side device can use the non-compressed PCM codes (including A-law or μ-law) which are easy to mix, and which cause no quality degradation or cost even when encoding and decoding are repeated, while the contents transmission from the upstream side device to the downstream side device can use the MPEG4 or SBC codes which are capable of the high quality transmission by using only a small bandwidth.

FIG. 8 shows a configuration of the source terminal device 11 which is compatible with the bidirectional transmission according to the second embodiment.

The source terminal device 11 according to the second embodiment comprises a radio input/output control unit 21, a downstream side control unit 22, a downstream side device information memory unit 23, a speech input unit 24, a speech coding unit 25, a communication setting unit 27, and a speech mixing unit 41, and transmits contents data 26.

The radio input/output control unit 21, the downstream side control unit 22, the downstream side device information memory unit 23, the speech input unit 24, and the communication setting unit 27 are the same as those of the source terminal device 11 according to the first embodiment so that their description will be omitted here.

The speech mixing unit 41 mixes the speech data received from a plurality of downstream side devices and the speeches inputted at the speech input unit 24. The speech coding unit 25 encodes these mixed speech data and generates the contents data 26 to be transmitted to the terminal network. This contents data 26 is given to the downstream side control unit 22, and transmitted to a plurality of connected downstream side devices through the radio input/output control unit 21.

Next, FIG. 9 shows a configuration of the receiving side terminal device 12, 13, 14 or 15 which is compatible with the bidirectional transmission according to the second embodiment.

The receiving side terminal device 12, 13, 14 or 15 according to the second embodiment comprises a radio input/output control unit 21, a downstream side control unit 22, a downstream side device information memory unit 23, a speech input unit 24, a communication setting unit 27, an upstream side control unit 31, a speech decoding unit 32, a speech output unit 33 and a speech mixing unit 41, and transmits or receives contents data 26.

The radio input/output control unit 21, the downstream side control unit 22, the downstream side device information memory unit 23, the communication setting unit 27, the speech decoding unit 32 and the speech output unit 33 are the same as those of the receiving side terminal device according to the first embodiment so that their description will be omitted here.

The receiving side terminal device 12, 13, 14 or 15 receives the contents data 26 from the upstream side device, decodes the speech information contained in the contents data 26, and presents the speech signals in an acoustically audible form. This contents data 26 is given to the downstream side control unit 22, and transmitted to the plurality of connected downstream side devices through the radio input/output control unit 21. This function is the same as that of the receiving side terminal device 12, 13, 14 or 15 according to the first embodiment.

In addition, the receiving side terminal device 12, 13, 14 or 15 according to the second embodiment has the speech input unit 24 and the speech mixing unit 41. The speech input unit 24 inputs the speeches. More specifically, the speech input unit 24 inputs shout, yell, hand clapping, etc., of the terminal user. The speech mixing unit 41 mixes the speech data received from a plurality of downstream side devices and the speeches inputted at the speech input unit 24. The upstream side control unit 31 transmits the mixed speech data to the connected upstream side device.

According to the source terminal device 11 and the receiving side terminal device 12, 13, 14 or 15 of the second embodiment, by inputting the speech data such as shout, yell, and hand clapping of the user of the receiving side terminal device, it becomes possible to transmit the speeches of the participating audience of the lecture or the playing. That is, the bidirectional transmission can be carried out easily.

Next, the radio communication method according to the second embodiment will be described with reference to FIG. 10. In FIG. 10, as an example, a method in which the speech inputted at the downstream side device of the receiving side terminal device B 13, the speech inputted at the receiving side terminal device B 13, and the speech inputted at the source terminal device 11 are mixed, and the mixed speeches are transmitted from the source terminal device 11 to each downstream side device will be described.

(A) First, at the step S501, the receiving side terminal device B 13 receives the speech data from the receiving side terminal device C 14. This speech data is data in which the speech inputted from the speech input unit 24 of the receiving side terminal device C 14 and the speech inputted from the speech input unit 24 of the downstream side device of the receiving side terminal device C 14 are mixed.

(B) Next, at the step S502, the speech data transmitted from the receiving side terminal device C 14 and the speech inputted at the receiving side terminal device B 13 are mixed by the speech mixing unit 41 of the receiving side terminal device B 13.

(C) Next, at the step S503, the receiving side terminal device B 13 transmits the mixed speech data to the source terminal device 11, and then, at the step S504, the source terminal device 11 receives the speech data.

(D) Next, at the step S505, the speech inputted from the speech input unit 24 of the source terminal device 11 and the speech data transmitted from the receiving side terminal device B 13 are mixed, and the contents data 26 is produced.

(E) Next, at the step S506, the source terminal device 11 transmits the contents data 26 to the receiving side terminal device B 13.

(F) Next, at the step S507, the receiving side terminal device B 13 transmits the contents data 26 to the receiving side terminal device C 14, and at the step S508, the receiving side terminal device B 13 outputs the speeches contained in the contents data 26 from the speech output unit 33. The speeches outputted from the speech output unit 33 are speeches in which the speech of the lecturer or the player inputted at the source terminal device 11 and the hand clapping or the shout inputted at the receiving side terminal device B 13 and the others.

In the radio communication method according to the second embodiment, the connection operation between the upstream side device and the downstream side device is the same as that of FIG. 4 and FIG. 6 described for the first embodiment, so that it description will be omitted here.

According to the radio communication method of the second embodiment, by inputting the speech data such as shout, yell, and hand clapping of the user of the receiving side terminal device, it becomes possible to transmit the speeches of the participating audience of the lecture or the playing. That is, the bidirectional transmission can be carried out easily.

Next, the other embodiments of the present invention will be described in detail.

It should be noted that the present invention is not limited to the embodiments described above, and there are many modifications or variations that can be made to the above described embodiments.

For example, in the first and second embodiments of the present invention, the source terminal device 11 and the receiving side terminal device 12, 13, 14 or 15 are distinguished, but it is possible to configure a terminal that has functions of both of them and these functions can be made switchable, such that one terminal can be used as either the source terminal device 11 or the receiving side terminal device 12, 13, 14 or 15.

Also, in the first and second embodiments of the present invention, a configuration for the unidirectional transmission and a configuration for the bidirectional transmission are distinguished, but they can be combined. In this case, only terminals for the unidirectional transmission will be connected to the downstream side of the terminal for the unidirectional transmission. Also, the number of terminals for the unidirectional transmission can be limited such that at least one terminal for the bidirectional transmission can be connected to the downstream side of the terminal for the bidirectional transmission. By including information to indicate whether the downstream side device is the unidirectional one or the bidirectional one in the information such as the search request to be transmitted from the downstream side device at a time of the connection between the terminals, the upstream side device can make the search response by distinguishing these two to make the connection selectively.

Also, in the first and second embodiments of the present invention, only the speech input unit 24 is provided in order to produce the contents data 26 of the source terminal device 11, but it is also possible to provide a video input unit such as a camera and a video coding unit so as to enable the video input. Also, only the speech output unit 33 is provided in order to reproduce the contents data 26 of the receiving side terminal device 12, 13, 14 or 15, but it is also possible to provide a video output unit such as a head mounting display or the like and a video decoding unit so as to enable the video output.

Also, in the first and second embodiments of the present invention, the identifier for specifying the terminal network is judged at a time of making the connection between the terminals, but it is also possible to attempt to make connections with all the communication possible terminals without setting the identifier.

Also, in the first embodiment of the present invention, when a plurality of connectable terminals exist in the connection operation of FIG. 4 and FIG. 6, the connection operation is carried out by selecting a terminal for which the number of relaying from the source terminal device 11 is smaller as the upstream side device, but it is also possible to use the other methods such as that for selecting a terminal from which the search response is received earlier as the connection target.

Also, in the first embodiment of the present invention, the condition such as the identifier for specifying the terminal network is judged at a timing of the device search and the search response in the connection operation of FIG. 4 and FIG. 6, but it is also possible to judge whether or not to maintain the connection by exchanging information for setting the condition, after establishing the connection by carrying out the terminal search unconditionally.

In the exemplary case of the Bluetooth, the device discovery is carried out first to detect a connectable terminal and then the service discovery for each one is carried out in the connection operation of FIG. 4 and FIG. 6. At a time of this service detection, the number of relaying possessed by the terminal can be stored into the response for the service detection and transmitted to the terminal that issued the connection request, such that the terminal to be connected can be selected by utilizing the number of relaying stored in the received response.

Also, in the first and second embodiments of the present invention, the terminal in a shape of a headset to be worn on the head is used, but it is also possible to use terminals in other shapes as long as they are equipped with the speakers (and a microphone in the case where the speech input is necessary). For example, the terminal can be in a shape of a handset to be held by the hand, or in a shape of a helmet for protecting the head which is equipped with speakers and a microphone inside. The speakers and the microphone may not necessarily be built-in parts of the device itself, and it is possible to provide only the external terminals to which the speakers and the microphone can be connected according to the need.

According to the present invention, it is possible to enlarge the transmission range arbitrarily while using the low power radio, and it is possible to provide the radio communication device and the radio communication method capable of realizing the bidirectional transmission.

It is also to be noted that, besides those already mentioned above, many modifications and variations of the above embodiments may be made without departing from the novel and advantageous features of the present invention.

Accordingly, all such modifications and variations are intended to be included within the scope of the appended claims.

What is claimed is:

1. A radio communication terminal device for use as a source terminal device in a radio communication terminal network with a tree structure in which a plurality of receiving side terminal devices on a downstream side of the source terminal device are connected to the source terminal device, each receiving side terminal device includes an upstream side control unit configured to make a connection for communication with an upstream side device and a downstream side control unit configured to make a connection for communication with a downstream side device, and other receiving side terminal devices on a further downstream side are connected to at least one of the plurality of the receiving side terminal devices and have the same functions as the receiving side terminal devices, the radio communication terminal device comprising:

a speech input unit configured to input speeches;

a speech coding unit configured to encode the speeches inputted by the speech input unit to generate contents data;

a downstream side control unit configured to respond to a search from one downstream side device that requests the contents data among a plurality of downstream side devices or search the one downstream side device, and make a connection for communication with the one downstream side device; and a radio input/output control unit configured to transmit the contents data to the one downstream side device.

2. The radio communication terminal device of claim 1, further comprising:

a speech mixing unit configured to mix the speeches inputted by the speech input unit and speech data received from the one downstream side device;

wherein the speech coding unit encodes the speeches mixed by the speech mixing unit to generate the contents data.

3. The radio communication terminal device of claim 1, wherein the speech input unit is a microphone provided on the radio communication terminal device in a shape of a headset.

4. The radio communication terminal device of claim 1, wherein the downstream side control unit is capable of making connections with more than one downstream side devices, with an upper limit given by a prescribed number of connectable devices.

5. The radio communication terminal device of claim 4, wherein the prescribed number of connectable devices is set according to a bandwidth required for transmission of the contents data.

6. The radio communication terminal device of claim 1, wherein the radio input/output control unit carries out communications by utilizing an ISM band of 2.4 GHz band and a frequency hopping spectrum spreading scheme.

7. A radio communication terminal device for use as a receiving side terminal device in a radio communication terminal network with a tree structure in which a plurality of receiving side terminal devices on a downstream side of a source terminal device are connected to the source terminal device, and other receiving side terminal devices on a further downstream side are connected to at least one of the plurality of the receiving side terminal devices and have the same functions as the receiving side terminal devices, the radio communication terminal device comprising:

an upstream side control unit configured to search one upstream side device that provides contents data containing speech information among a plurality of upstream side devices or respond to a search from the one upstream side device, and make a connection for communication with the one upstream side device;

a downstream side control unit configured to respond to a search from one downstream side device that requests the contents data among a plurality of downstream side devices or search the one downstream side devices, and make a connection for communication with the one downstream side device;

a radio input/output control unit configured to receive the contents data from the one upstream side device and transmit the contents data to the one downstream side device;

a speech decoding unit configured to decode the speech information contained in the contents data; and a speech output unit configured to present the speech information decoded by the speech decoding unit in an acoustically audible form.

8. The radio communication terminal device of claim 7, further comprising:

a speech input unit configured to input speeches; and a speech mixing unit configured to mix the speeches inputted by the speech input unit and speech data received from the one downstream side device;

wherein the radio input/output control unit transmits the contents data containing the speeches mixed by the speech mixing unit to the one upstream side device.

9. The radio communication terminal device of claim 8, wherein the speech input unit is a microphone provided on the radio communication terminal device in a shape of a headset.

10. The radio communication terminal device of claim 7, wherein the speech output unit is speakers provided on the radio communication terminal device in a shape of a headset.

11. The radio communication terminal device of claim 7, wherein the upstream side control unit makes the connection with the one upstream side device for which a number of relaying from the source terminal device is smaller than those of other upstream side devices, with a priority over the other upstream side devices.

12. The radio communication terminal device of claim 7, wherein the downstream side control unit is capable of making connections with more than one downstream side devices, with an upper limit given by a prescribed number of connectable devices.

13. The radio communication terminal device of claim 12, wherein the prescribed number of connectable devices is set according to a bandwidth required for transmission of the contents data.

14. The radio communication terminal device of claim 7, wherein the radio input/output control unit carries out communications by utilizing an ISM band of 2.4 GHz band and a frequency hopping spectrum spreading scheme.

15. A radio communication method in a radio communication terminal network with a tree structure in which a plurality of receiving side terminal devices on a downstream side of a source terminal device are connected to the source terminal device, each receiving side terminal device includes an upstream side control unit configured to make a connection for communication with an upstream side device and a downstream side control unit configured to make a connection for communication with a downstream side device, and other receiving side terminal devices on a further downstream side are connected to at least one of the plurality of the receiving side terminal devices and have the same functions as the receiving side terminal devices, the radio communication method comprising:

transmitting contents data from the source terminal device to the plurality of the receiving side terminal devices on the downstream side, the contents data containing speeches inputted at the source terminal device;

relaying and transmitting the contents data at one receving side terminal device among the plurality of the receiving side terminal devices, to one other receiving side terminal devices among the other receiving side terminal devices on the further downstream side;

extracting the speeches contained in the contents data and outputting the speeches in an audible form at the one receiving side terminal device; and extracting the speeches contained in the contents data and outputting the speeches in an audible form at the one other receiving side terminal device.

16. A radio communication system comprising:

a source terminal device including a downstream side control unit configured to respond to a search from one downstream side device that requests contents data containing speech information among a plurality of downstream side devices or search the one downstream side device, and to make a connection for communication with the one downstream side device; and a plurality of receiving side terminal devices on a downstream side of the source terminal device connected to the source terminal device, each receiving terminal device including:

an upstream side control unit configured to search one upstream side device that provides the contents data among a plurality of upstream side devices or to respond to a search from the one upstream side device, and to make a connection for communication with the one upstream side device; and a downstream side control unit configured to respond to a search from one downstream side device that requests the contents data among a plurality of downstream side devices or to search the one downstream side devices, and to make a connection for communication with the one downstream side device; and other receiving side terminal devices on a further downstream side connected to at least one of the plurality of the receiving side terminal devices and having the same functions as the receiving side terminal devices.

* * * * *

UNITED STATES PATENT AND TRADEMARK OFFICE
CERTIFICATE OF CORRECTION

PATENT NO. : 7,469,148 B2  Page 1 of 1
APPLICATION NO. : 11/281468
DATED : December 23, 2008
INVENTOR(S) : Momosaki et al.

It is certified that error appears in the above-identified patent and that said Letters Patent is hereby corrected as shown below:

On the title page, Item (45), the Terminal Disclaimer information has been omitted. Item (45) should read:

--(45) Date of Patent: * Dec 23, 2008

( * ) Notice: Subject to any disclaimer, the term of this patent is extended or adjusted under 35 U.S.C. 154(b) by 270 days.

This patent is subject to a terminal disclaimer.--

Signed and Sealed this

Seventeenth Day of February, 2009

JOHN DOLL
*Acting Director of the United States Patent and Trademark Office*